(12) United States Patent
Mitchell et al.

(10) Patent No.: US 7,517,301 B2
(45) Date of Patent: Apr. 14, 2009

(54) METHOD AND CODE FOR DETERMINING SELECTING GEAR RATIO OF MANUAL TRANSMISSION

(75) Inventors: John S Mitchell, Farmington Hills, MI (US); Amit K Sanyal, W. Novi, MI (US); James L Dowbenko, Waterford, MI (US); Ezio N Vermiglio, Tipton, MI (US)

(73) Assignee: Chrysler LLC, Auburn Hills, MI (US)

( * ) Notice: Subject to any disclaimer, the term of this patent is extended or adjusted under 35 U.S.C. 154(b) by 312 days.

(21) Appl. No.: 11/424,897

(22) Filed: Jun. 19, 2006

(65) Prior Publication Data

US 2007/0289400 A1 Dec. 20, 2007

(51) Int. Cl.
*B60W 10/04* (2006.01)
(52) U.S. Cl. ...................................... 477/107
(58) Field of Classification Search ............... 74/336 R; 477/107; 701/51, 64
See application file for complete search history.

(56) References Cited

U.S. PATENT DOCUMENTS 4,294,341 A * 10/1981 Swart ........................ 477/78
4,701,852 A * 10/1987 Ulveland ..................... 701/64
5,563,784 A * 10/1996 Miener ........................ 701/51
5,921,135 A * 7/1999 Friedrich et al. .............. 74/335
5,941,922 A * 8/1999 Price et al. .................... 701/51
6,056,669 A 5/2000 Marshall
6,151,543 A * 11/2000 McKee et al. ................. 701/55
6,189,665 B1 2/2001 Yamamoto et al.
7,219,782 B2 * 5/2007 Pettersson et al. .......... 192/3.62

* cited by examiner

*Primary Examiner*—Dirk Wright
(74) *Attorney, Agent, or Firm*—Ralph E. Smith

(57) ABSTRACT

A method and associated computer-executable code for controlling an automotive powertrain featuring a manual transmission determines a current transmission output speed based at least in part on the vehicle speed achieved in response to a torque request signal; determines an effective transmission gear ratio based on the engine speed and the transmission output speed; and compares the effective transmission gear ratio to each of the predetermined transmission gear ratios. A transmission shift is deemed to be in progress when the effective transmission gear ratio is not within a predetermined tolerance of any of the predetermined transmission gear ratios. Relatively-aggressive smoothing of the torque request signal upon pedal tip-out is advantageously canceled when a shift is deemed to be in progress, thereby reducing the likelihood of unintended engine speed and/or transient flares when a declutching event follows shortly after the pedal tip-out.

17 Claims, 3 Drawing Sheets

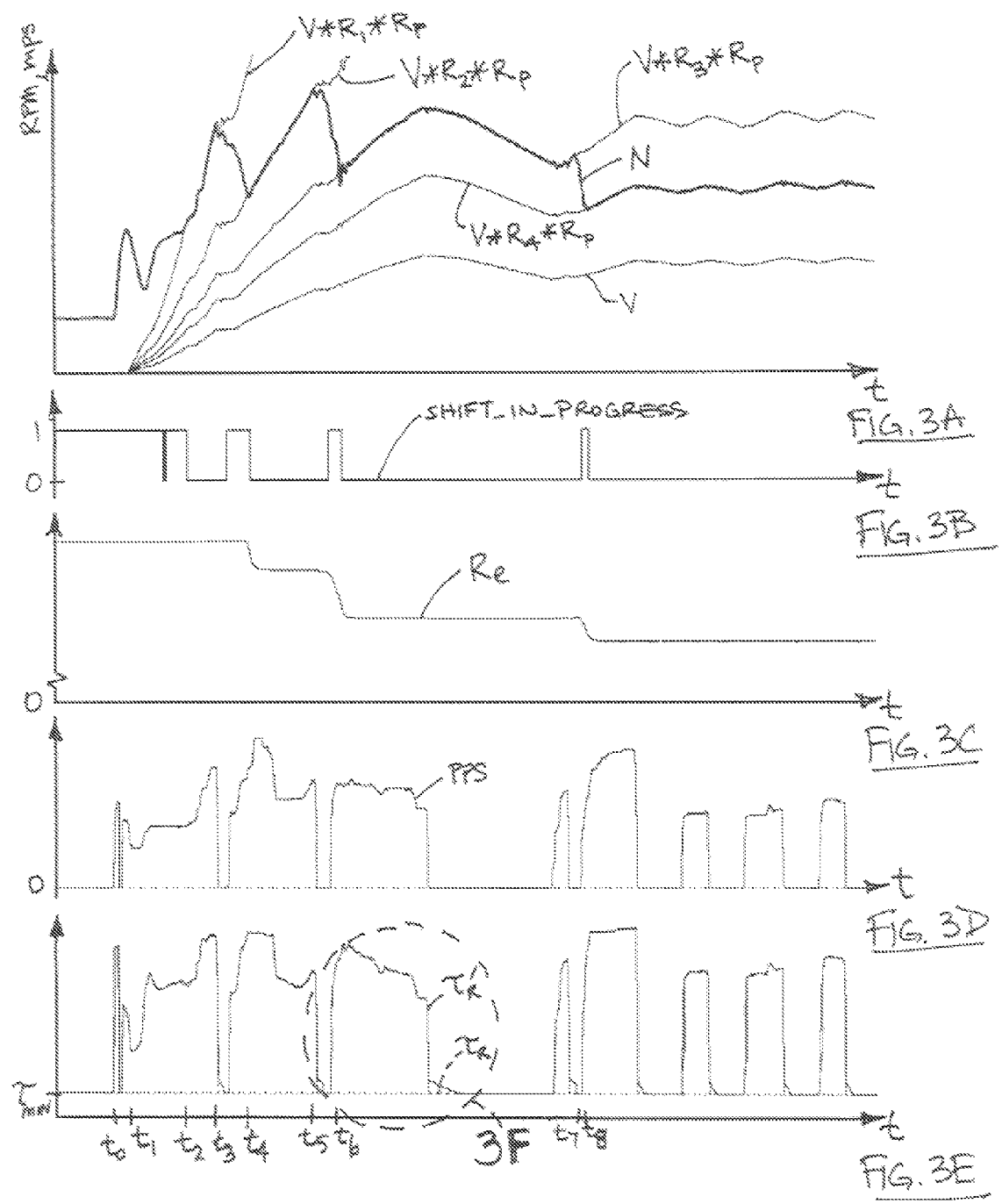

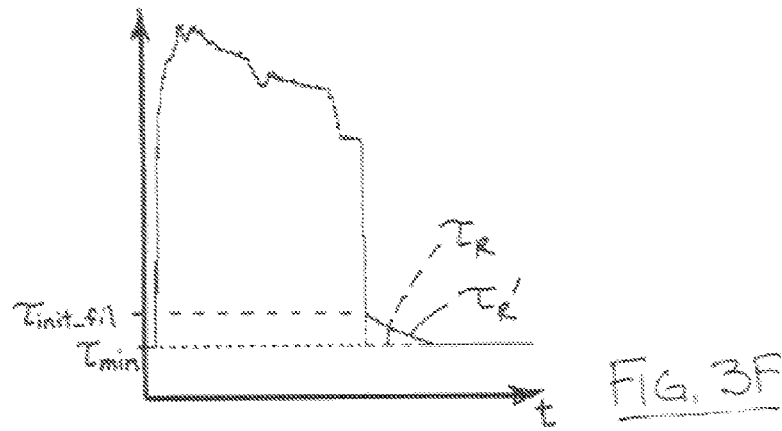
FIG. 3F
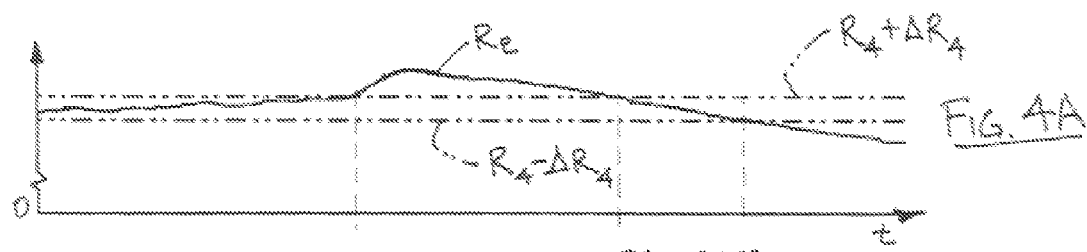
FIG. 4A
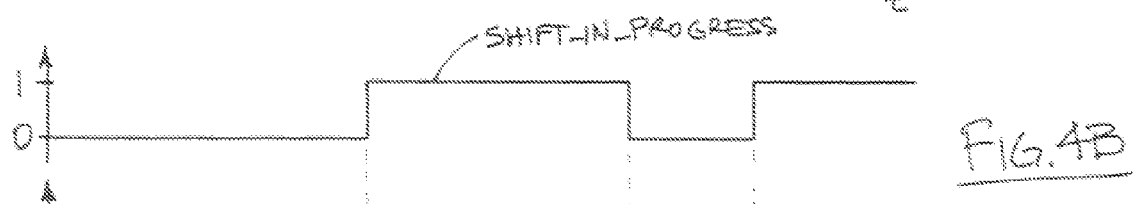
FIG. 4B
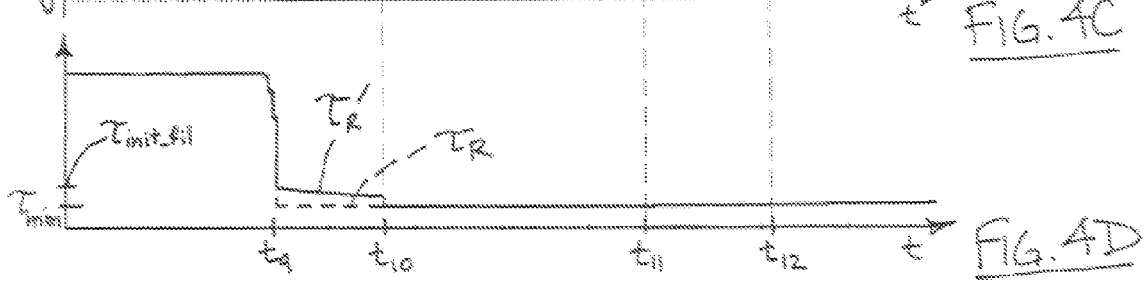
FIG. 4C
FIG. 4D

METHOD AND CODE FOR DETERMINING SELECTING GEAR RATIO OF MANUAL TRANSMISSION

FIELD OF THE INVENTION

The invention relates generally to a method and related computer-executable code for determining which gear of a manual automotive transmission. If any, has been selected by a vehicle operator and, correlatively, for determining when a transmission gear shift is in progress.

BACKGROUND OF THE INVENTION

Electronic throttle control (ETC) systems are increasingly being utilized to control airflow into automotive engines to achieve improved vehicle emissions control, vehicle fuel efficiency, and vehicle drivability. In one such system, an engine torque request signal is generated based on a driver demand signal derived, for example, from the output of an accelerator pedal position sensor, perhaps in combination with a number of additional detected or inferred powertrain and/or vehicle operating parameters, and detected or inferred ambient conditions (such as intake air temperature and ambient humidity). A throttle plate in the engine's air intake, as well as perhaps a variation in the engine's nominal intake valve timing, are then controlled in response to the resulting torque request signal to thereby control airflow into the engine and the resulting generated torque output.

In order to improve vehicle drivability and reduce vehicle NVH, known ETC systems advantageously filter or "smooth" the generated torque request signal during demand signal transitions, particularly when the driver "lets up" on the accelerator pedal to thereby rapidly reduce the driver demand signal as sensed by a pedal position sensor (PPS) to a minimum value (also known as throttle "tip-out" and "close pedal"), to obtain a filtered requested torque signal that drops more slowly and ultimately blends into a corresponding minimum torque request. While such requested torque filtering can be particularly advantageous when the engine is coupled to a manual transmission, for example, to avoid generating undesirable drivetrain "clunk" due to mechanical lash within the drivetrain in response to abrupt requested torque transitions, this filtering technique can cause an unintended (upward) engine speed flare if the manual transmission is also being declutched during this filtered requested torque transition.

SUMMARY OF THE INVENTION

In accordance with an aspect of the invention, a method and associated computer-executable code are provided for controlling an automotive powertrain to achieve a vehicle speed in response to a driver demand signal, wherein the powertrain includes an engine driving an output shaft at an engine speed, the output shaft being selectively coupled and decouped to a driven wheel through a "manual" transmission having a plurality of manually-selectable gearsets, and a differential having a pinion factor. The method generally includes generating a torque request signal based on the driver demand signal; determining a current transmission output speed based at least in part on the vehicle speed achieved in response to the torque request signal; determining an effective transmission gear ratio based on the engine speed and the transmission output speed; and comparing the effective transmission gear ratio to each of the predetermined transmission gear ratios.

In accordance with an aspect of the invention, the method further includes determining that a transmission shift is in progress, i.e., that a given gearset of the transmission is not fully engaged to thereby couple the engine output shaft to the differential, when the effective transmission gear ratio is not within a predetermined tolerance of any of the predetermined transmission gear ratios. While the invention contemplates use of any suitable tolerances, including different tolerances above and below each of the predetermined transmission gear ratios, in a preferred embodiment, a tolerance band of plus-or-minus five percent (±5%) for each of the predetermined transmission gear ratios is conveniently employed to determine whether a full engagement of one of the transmission's gearsets can be inferred from the determined effective transmission gear ratio.

In accordance with another aspect of the invention, in a preferred method for practicing the invention that further includes filtering the torque request signal over time using a filter coefficient to obtain a second torque request signal, the filter coefficient is modified or, perhaps, all filtering of the torque request signal is inhibited, when the transmission shift is in progress. In this manner, the invention advantageously avoids unintended (upward) engine speed flares when a throttle tip-out is accompanied by a declutching (disengagement) of the transmission.

In accordance with another feature of the invention, the preferred method advantageously determines which gearset of the transmission has been engaged by the driver, based on the comparison of the effective transmission gear ratio with the predetermined transmission gear ratios, without directly sensing either the transmission output speed or, indeed, the transmission/shift linkage itself.

In accordance with yet another aspect of the invention, in a preferred method for controlling a powertrain in which a differential having a predetermined pinion factor (or, alternatively, an activated reducing-gear transfer case and a differential, with a predetermined effective pinion factor) couples the transmission to the driven wheel, the method further includes updating a stored value for the pinion factor (or the effective pinion factor) based on the engine speed and vehicle speed when the method has otherwise determined that the engine output shaft is coupled to the differential by a specific gearset of the transmission, most preferably, by the top-gear-ratio gearset of the transmission shift is in progress. In this manner, the invention advantageously avoids unintended (upward) engine speed flares when a throttle tip-out is accompanied by a declutching (disengagement) of the transmission.

In accordance with another feature of the invention, the resulting transmission shift-in progress information may also be used to determine whether the driver has placed the transmission in neutral. By way of example, a preferred method for practicing the invention further includes determining that the transmission is in neutral if it has been determined that a transmission shift has been "in progress" for at least a minimum time period. While the determination that the transmission has been placed in neutral may be used for any suitable purpose, the preferred method further includes adjusting a minimum value for the torque request signal, preferably by reducing the minimum value for the torque request signal, when it is determined that the transmission is in neutral. In this way, the invention advantageously reduces the potential for drivetrain "clunk" upon reengagement of one of the transmission's gearsets, by increasing the likelihood that engine speed will appropriately be reduced prior to engagement of the gearset.

In accordance with yet another aspect of the invention, the preferred method advantageously determines which gearset of the transmission gear ratio with the predetermined transmission gear ratios, without directly sensing either the transmission output speed or, indeed, the transmission/shift linkage itself.

In accordance with yet another aspect of the invention, in a preferred method for controlling a powertrain in which a differential having a predetermined pinion factor (or, alternatively, an activated reducing-gear transfer case and a differential, with a predetermined effective pinion factor) couples the transmission to the driven wheel, the method further includes updating a stored value for the pinion factor (or the effective pinion factor) based on the engine speed and vehicle speed when the method has otherwise determined that the engine output shaft is coupled to the differential by a specific gearset of the transmission, most preferably, by the top-gear-ratio gearset of the transmission. In this way, the preferred method takes advantage of the learned top-gear ratio of the engine speed to vehicle speed to thereby required only one unique calibration per transmission, and to thereby obviate the need for any axle-specific calibration. And, by using the effective transmission gear ratio to determine whether a transmission shift is in progress, the method of the invention can advantageously be employed in a vehicle powertrain that includes a transfer case, simply by determining the effective pinion factor that is achieved when the transfer was is switched in "low" gear.

Other objects, features, and advantages of the present invention will be readily appreciated upon a review of the subsequent description of the preferred embodiment and the appended claims, taken in conjunction with the accompanying Drawings.

BRIEF DESCRIPTION OF THE DRAWINGS

FIGS. 3A-3E are a first set of correlated plots of engine speed, vehicle speed, and the product of vehicle speed, the nominal gearset gear ratio, and the pinion factor; of the determined transmission shift-in progress flag; of the determined effective transmission gear ratio; of the detected driver demand signal, as represented by the output of a pedal position sensor; and of the unfiltered and filtered requested torque signals, all versus time;

FIG. 3F is an enlarged view within Circle 3F of FIG. 3E, again showing unfiltered and filtered requested torque signals versus time; and FIGS. 4A-4D are a second set of correlated plots of the determined effective gear ratio and the tolerance band associated with the fourth gear ratio, the determined transmission shift-in progress flag, the driver demand signal, and the unfiltered and filtered requested torque signals, all versus time, during a single manual declutching event after the manual transmission has been operating in fourth gear.

DETAILED DESCRIPTION OF THE INVENTION

Figure 1:
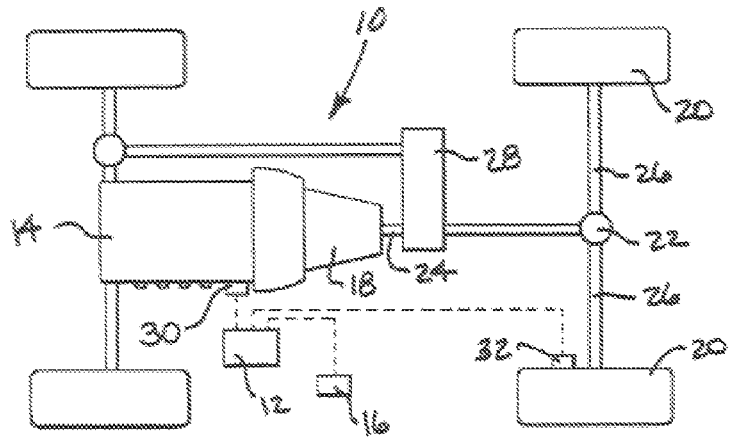
FIG. 1 is diagrammatic view of an exemplary vehicle powertrain including an electronic control module for controlling the operation of the engine in response to a driver demand signal, in accordance with the invention.

Referring to the Drawings, FIG. 1 is a diagrammatic view of an exemplary powertrain 10 for a motor vehicle that includes an electronic control module ("controller 12") for controlling the operation of an engine 14 based at least in part on a driver demand signal generated by an accelerator pedal position sensor 16, and a manual transmission 18 including several available gears by which the driver selectively couples the engine's output shaft to a driven vehicle wheel 20, either directly through a vehicle differential 22 coupling the transmission's output shaft 24 to the driven wheel's half-shaft 26 or, as seen in FIG. 1, indirectly through a driver-selectable reducing gearset of a transfer case 28. A suitable engine speed sensor 30 and at least on wheel speed sensor 32 generate respective signals from which the controller determines values N, V representative of the current engine speed and current vehicle speed, respectively.

Figure 2:
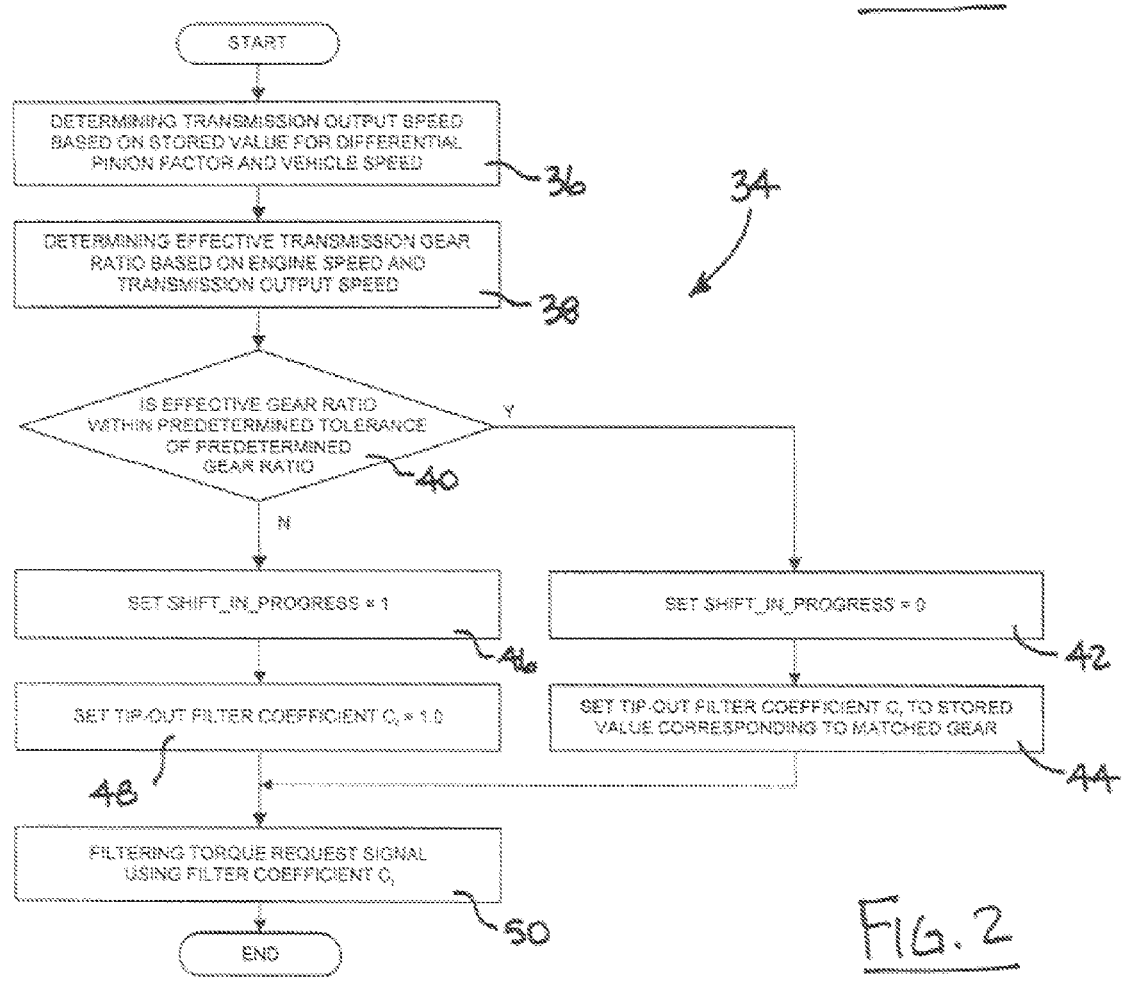
FIG. 2 is a flow chart illustrating the main steps of an exemplary method for determining when the manual transmission of a vehicle powertrain is placed "in gear" by the vehicle's driver and, further, when a transmission shift is otherwise deemed to be "in progress," in accordance with aspects of the invention.

FIG. 2 illustrates the main steps of an exemplary method 34, for use with a vehicle powertrain having a manual transmission such as the one illustrated diagrammatically in FIG. 1, to determine both when the driver has initiated a transmission gear shift (also referred to herein a "shift in progress"), and when the transmission 18 has either been shifted by the driver into a selected one of the transmission's several available gearsets, or has been placed "in neutral."

As seen in FIG. 2, the exemplary method 34 includes determining, at step 36, the speed of the transmission's output shaft 24 based on a previously-stored value for the differential's pinion factor (or, in the case of an engaged transfer case operating with its "low" gearset, the resulting effective pinion factor $R_p$), and the current value V for the vehicle speed, as determined by the controller 12 based upon the signal generated by the wheel sensor 32. The method 34 further includes determining whether the resulting effective transmission gear ratio is within a predetermined tolerance of one of the known gear ratios for the transmission 18. While the invention contemplates use of any suitable tolerances, either fixed or variable, including different preferably-calibratable tolerances bracketing each nominal transmission gear ratio, by which to infer an "in-gear" or "shift in progress" state of the transmission 18, in a preferred method, the tolerances are conveniently defined as plus-or-minus five percent (±5%) of the nominal gear ratio for each of the transmission's gearsets. If is determined, at step 40, that the effective transmission gear ratio is not within the tolerance band defined around any predetermined transmission gear ratio, at step 46, the flag SHIFT_IN_PROGRESS is set to logical one (indicating that a transmission shift is, indeed, "in progress"). At step 50, the method includes filtering the torque request signal using the filter coefficient, for example, when the driver demand signal drops rapidly below a predetermined value corresponding to a relatively-low positive generated brake torque (as described further below), in order to reduce the likelihood of drivetrain "clunk." While the invention contemplates filtering the torque request signal in any suitable manner, in the exemplary method 34, the filtered requested torque signal $\tau_R'$ is calculated as follows:

$$\tau_R' = C_f \times \tau_R + (1 - C_{71}) \times \tau_R'$$

wherein:

$\tau_R$ is the unfiltered requested torque signal; and $C_f$ is a previously-stored value for the filter coefficient ranging between zero and one, selected, for example, from several previously-stored values based on a determination of the previously "matched" gear.

Referring to the correlated set of plots of FIGS. 3A-3E, FIG. 3A is a plot of the engine speed N, the resulting vehicle speed V, and the product of vehicle speed V, nominal gearset gear ratio $R_1$ through $R_4$, and pinion factor $R_p$, all versus time t, as a vehicle driver "tips-in" and clutches the manual transmission 18 at time $t_0$ to launch the vehicle in first gear ($R_1$), then through several tip-outs and declutching/clutching events as the driver runs up through second ($R_2$), third ($R_3$), and, ultimately, into fourth gear ($R_4$), at times $t_1$ through $t_8$. FIG. 3A also includes an overlying plot of vehicle velocity V, for reference purposes. FIG. 3B shows the set value of the determined flag SHIFT_IN_PROGRESS, as the driver declutches and clutches through the several transmission gears $R_1$ through $R_4$. FIG. 3C is a plot of the effective transmission gear ratio $R_e$, calculated as the engine speed N divided by the product of the vehicle speed V and the pinion factor $R_p$ (from which the currently-selected transmission gearset is identified, as further described in connection with FIG. 4A below), versus time t, the periodic plateaus, for example, between times $t_4$ and $t_5$, and again between times $t_6$ and $t_7$ clearly correlate to the full engagement of an identifiable transmission gearset (specifically, in second gear between times $t_4$ and $t_5$, and in third gear between times $t_6$ and $t_7$).

FIG. 3D is a plot of the driver demand signal, as represented by the output PPS of a pedal position sensor 16, from which the requested torque signal $\tau_R$ is generated. FIG. 3E, as well as enlarged FIG. 3F, shows the resulting generated torque request signal $\tau_R$ (in broken line) and a filtered requested torque signal $\tau_R'$, each versus time t, illustrated the effect of the use of the filter coefficient $C_f$ in ordinarily smoothing the requested torque transitions to improve vehicle NVH. As best seen in FIG. 3F, in a preferred embodiment, the requested torque signal $\tau_R$ is filtered in response to a pedal tip-out only once the requested torque signal $\tau_R$ has dropped below a predetermined value $\tau_{init\_fil}$, wherein the predetermined value $\tau_{init\_fil}$ is a calibratable value representative of a minimum positive generated brake torque that will take up the mechanical lash in the drivetrain. In this manner, the method 34 advantageously provides a rapid engine torque to changes in sensed driver demand while reducing the likelihood of drivetrain clunk in response to a close-pedal input.

Referring to FIGS. 4A-4D, during a single manual declutching event following a pedal tip-out when driving, for example, in fourth gear ($R_4$), it will be seen that as the output signal PPS generated by the pedal position sensor 16 rapidly drops to a minimum value upon pedal tip-out at time $t_9$, the generated requested torque signal $\tau_R$ (in broken line) is filtered using the appropriate calibratable filter coefficient corresponding to fourth gear to thereby provide a smoothed torque request signal $\tau_R'$ (shown in solid line). However, at time $t_{10}$, when the effective transmission ratio $R_e$, as seen in FIG. 4A, exceeds the upper value of the corresponding fourth-gear tolerance band ($R_4+\Delta R$, wherein $\Delta R$ is equal, for example, to five percent (5%) of the nominal fourth gear ratio $R_4$), the controller 12 sets the filter coefficient to 1.0 to nullify or cancel signal smoothing, whereupon the filtered requested torque signal $\tau_R'$ drops immediately to its unfiltered (minimum) value $\tau_R$ to thereby reduce the potential for unintended engine speed flare. It will be appreciated that, by nullifying signal smoothing when a declutching event follows a throttle tip-out, the invention advantageously permits use of relatively-aggressive tip-out filtering of the requested torque signal $\tau_{init\_fil}$, while otherwise avoiding the unintended engine speed or transient torque flares upon declutching.

Referring again to FIGS. 4A-4D, as the vehicle speed begins to drop after the declutching, the effective transmission gear ratio $R_e$ ultimately falls back into the fourth gear tolerance band at time $t_{11}$, whereupon the controller 12 sets the flag SHIFT_IN_PROGRESS to logical zero, determines the selected gear (in this case, fourth gear), and sets the filter coefficient $C_f$ back to the stored value corresponding to fourth gear. Then, at time $t_{12}$, the effective transmission gear ratio $R_e$ ultimately falls below the lower value of the corresponding fourth-gear tolerance band ($R_4-\Delta R$), whereupon the controller 12 again sets the flag SHIFT_IN_PROGRESS to logical one and the filter coefficient $C_f$ to 1.0.

In accordance with yet another aspect of the invention, the flag SHIFT_IN_PROGRESS can advantageously be used to identify when the transmission has been placed in a neutral state. By way of example only, and referring again to FIGS. 4A-4D, in the exemplary method 34, if the time period between time $t_{10}$ and time $t_{11}$ exceeds a predetermined minimum time period $t_{min}$, the controller 12 declares the transmission in a neutral state. While any suitable predetermined minimum time period $t_{min}$ may be used, in the exemplary method 34, the controller 12 declares a neutral state if the flag SHIFT_IN_PROGRESS remains "high" for about two seconds (2 sec). While the identification of the neutral state can be used for any suitable purpose, in a preferred method, once neutral is declared. If the current engine speed is below a predetermined threshold (e.g., 2500 RPM), the controller 12 advantageously regards the transmission as remaining in neutral until both the driver "tips in" and the effective transmission ratio once again falls within a tolerance band corresponding to one of the transmissions gearsets. If the current engine speed is equal to or greater than the predetermined threshold, the controller 12 will permit an exit from neutral even when the pedal is in a closed position, for example, to accommodate engine downshifts when the vehicle is proceeding down a grade.

Additionally, in the exemplary method 34, the controller 12 advantageously modifies the requested torque signal as generated from the driver demand signal (as represented by the output PPS of the pedal position sensor 16) when the neutral transmission state has been declared. By way of example only, in the exemplary method 34, the controller 12 reduces the minimum value $\tau_{min}$ for the requested torque signal when the transmission 18 is determined to be in a neutral state, to provide an additional assurance that the engine speed will appropriately drop to idle when in neutral. The invention further contemplates determining the minimum value $\tau_{min}$ for the requested torque signal based upon the "matched" gear to similarly improve vehicle drivability.

Finally, the exemplary method 34 advantageously includes updating the stored value for the pinion factor (or, the effective pinion factor), as determined by the controller 12 based on the engine speed and the vehicle speed when the it has been otherwise determined that the transmission is operating in a specific gearset, most preferably, the transmission's top-gear-ratio gearset (as operation in the top-gear-ratio gearset is most readily differentiated from the transmission's neutral state). In this way, the exemplary method 34 takes advantage of the learned top-gear ratio of the engine speed to vehicle speed to thereby require only one unique calibration per transmission, and to thereby obviate the need for any axle- and tire-specific calibration. And, by using the effective transmission gear ratio to determine whether a transmission shift is in progress, the method of the invention can advantageously be employed in a vehicle powertrain that includes a transfer case, simply by determining the effective pinion factor that is achieved when the transfer case is switched into "low" gear.

While the above description constitutes the preferred embodiment, it will be appreciated that the invention is susceptible to modification, variation and change without departing from the proper scope and fair meaning of the subjoined claims.

What is claimed is:

1. A method for controlling an automotive powertrain to achieve a vehicle speed in response to a driver demand signal, wherein the powertrain includes an engine having an output shaft, driven at an engine speed, that is selectively coupled and decoupled to a driven wheel through at least a transmission having a plurality of manually-selectable gearsets providing predetermined gear ratios, and a differential having a pinion factor, the method comprising:

determining a current transmission output speed based on the vehicle speed and the pinion factor;

determining an effective transmission gear ratio based on the engine speed and the transmission output speed;

comparing the effective transmission gear ratio to each of the predetermined gear ratios;

determining that a transmission shift is in progress when the effective transmission gear ratio is not within a predetermined tolerance of any of the predetermined gear ratios;

determining that the transmission is in neutral if the transmission shift has been in progress for at least a minimum time period;

generating a torque request signal based on the driver demand signal, the torque request signal having a minimum value; and adjusting the minimum value for the torque request signal when the transmission is in neutral.

2. The method of claim 1, further including filtering the torque request signal over time using a filter coefficient, and modifying the filter coefficient based on the comparing step.

3. The method of claim 1, including determining whether a given gearset of the transmission is coupling the engine output shaft to the driven wheel based on the comparing step.

4. The method of claim 3, wherein the given gearset of the transmission is the top-gear-ratio gearset; and further including updating a stored value for the pinion factor based on the engine speed and vehicle speed when the engine output shaft is coupled to the differential by the top-gear-ratio gearset of the transmission.

5. In a vehicle powertrain including a transmission having a plurality of manually-selectable gear ratios providing predetermined gear ratios, and a differential having a pinion factor, for selectively coupling and decoupling an engine output shaft rotating at an engine speed to a driven wheel to thereby achieve a vehicle speed in response to a driver demand signal, a method comprising:

generating a torque request signal based on the driver demand signal;

determining a current transmission output speed based on the vehicle speed achieved by operating the engine using the torque request signal, and the pinion factor;

determining an effective transmission gear ratio based on the engine speed and the transmission output speed; and comparing the effective transmission gear ratio to each of the predetermined gear ratios.

6. The method of claim 5, further including determining that the engine output shaft is not coupled by the transmission to the differential when the effective transmission gear ratio is not within a predetermined tolerance of any of the predetermined gear ratios.

7. The method of claim 6, further including filtering the torque request signal over time using a filter coefficient, and modifying the filter coefficient when the engine output shaft is not coupled by the transmission to the differential.

8. The method of claim 6, further including determining that the transmission is in neutral if the engine output shaft is not coupled by the transmission to the differential for at least a predetermined minimum time period.

9. The method of claim 8, wherein the first torque request signal has a minimum value, and further including reducing the minimum value for the first torque request when the transmission is in neutral.

10. The method of claim 5, including determining whether a given gearset of the transmission is coupling the engine output shaft through the differential to the driven wheel based on the engine speed and the estimated transmission input speed corresponding to the given gearset.

11. The method of claim 5, wherein the given gearset of the transmission is the top-gear-ratio gearset, and further including updating a stored value for the pinion factor based on the engine speed and vehicle speed when the engine output shaft is coupled to the differential by the top-gear-ratio gearset of the transmission.

12. A computer-readable storage medium including computer-executable code for controlling an engine of a motor vehicle, wherein the engine has a output shaft selectively coupled and decoupled to a driven wheel of the vehicle by a transmission having a plurality of manually-selectable gear ratios providing predetermined gear ratios, and a differential having a pinion factor, the storage medium including:

code for generating a torque request signal based on a driver demand signal;

code for determining a value representative of current engine speed achieved in response to the torque request signal;

code for determining a value representative of current vehicle velocity;

code for determining a current transmission output speed based on the value representative of current vehicle velocity and a stored value representative of the pinion factor;

code for determining a value representative of an effective transmission gear ratio based on the engine speed and the transmission output speed; and code for comparing the value representative of the effective transmission gear ratio to at least one stored value corresponding to each of the predetermined gear ratios.

13. The storage medium of claim 12, further including code for determining that the engine output shaft is not coupled by the transmission to the driven wheel when the effective transmission gear ratio is not within a predetermined tolerance of any of the one stored values corresponding to the predetermined gear ratios.

14. The storage medium of claim 13, further include code for filtering the torque request signal over time using a filter coefficient; and code for modifying the filter coefficient when the engine output shaft is not coupled by the transmission to the driven wheel.

15. The storage medium of claim 13, wherein the torque request signal has a minimum value, and further including code for adjusting the minimum value for the torque request signal when the engine output shaft is not coupled to the driven wheel.

16. The storage medium of claim 12, including code for determining when the engine output shaft is being coupled by a given gearset of the transmission based on the value representative of the effective transmission gear ratio and the at least one stored value corresponding to the predetermined gear ratio of the given gearset.

17. The storage medium of claim 16, wherein the given gearset of the transmission is the top-gear-ratio gearset, and further including code for updating the stored value representative of the pinion factor based on the determined values for the current engine speed and the vehicle speed when the engine output shaft is coupled to the differential by the top-gear-ratio gearset of the transmission.

* * * * *